(12) United States Patent
Ukita et al.

(10) Patent No.: US 9,896,055 B2
(45) Date of Patent: Feb. 20, 2018

(54) FIXING STRUCTURE FOR INFLATOR AND AIRBAG

(71) Applicant: DAICEL CORPORATION, Osaka-shi, Osaka (JP)

(72) Inventors: Shinichiro Ukita, Tatsuno (JP); Masayuki Yamazaki, Tatsuno (JP)

(73) Assignee: DAICEL CORPORATION, Osaka-shi (JP)

( * ) Notice: Subject to any disclaimer, the term of this patent is extended or adjusted under 35 U.S.C. 154(b) by 0 days.

(21) Appl. No.: 14/917,678

(22) PCT Filed: Oct. 1, 2014

(86) PCT No.: PCT/JP2014/076249
§ 371 (c)(1),
(2) Date: Mar. 9, 2016

(87) PCT Pub. No.: WO2015/060080
PCT Pub. Date: Apr. 30, 2015

(65) Prior Publication Data
US 2016/0214559 A1   Jul. 28, 2016

(30) Foreign Application Priority Data
Oct. 22, 2013   (JP) .................................. 2013-218799

(51) Int. Cl.
*B60R 21/217*   (2011.01)
*B60R 21/26*   (2011.01)

(52) U.S. Cl.
CPC ........ *B60R 21/217* (2013.01); *B60R 21/2171* (2013.01); *B60R 2021/2177* (2013.01);
(Continued)

(58) Field of Classification Search
CPC .............. B60R 21/217; B60R 21/2171; B60R 2021/26082; B60R 2021/2177; B60R 2021/2178; B60R 2021/26076
See application file for complete search history.

(56) References Cited

U.S. PATENT DOCUMENTS 5,425,548 A   6/1995   Rasmussen
5,443,284 A *   8/1995   Strahl ................... B60R 21/217
                                                          280/728.2
(Continued)

FOREIGN PATENT DOCUMENTS

JP   7-117611 A   5/1995
JP   3029284 U   7/1996
(Continued)

*Primary Examiner* — Laura Freedman
(74) *Attorney, Agent, or Firm* — Birch, Stewart, Kolasch & Birch, LLP

(57) ABSTRACT

An inflator and airbag are fixed by a fixing member including a lower fixing member that supports and fixes the inflator from a lower surface side of a plate portion. The lower fixing member has a tubular wall portion and a flange portion formed at an opening at one end. The tubular wall portion has an inner surface in a shape that is fitted to a circumferential wall surface, including a lower annular step surface, of the inflator housing. The flange portion has a plurality of bolt holes and abuts against a lower surface of the plate portion. The airbag and the lower fixing member are fixed with a bolt and a nut mounted through the airbag, the plate portion, and the flange portion of the lower fixing member.

4 Claims, 2 Drawing Sheets

(52) U.S. Cl.
CPC .......... *B60R 2021/2178* (2013.01); *B60R 2021/26076* (2013.01); *B60R 2021/26082* (2013.01)

(56) References Cited

U.S. PATENT DOCUMENTS

| | | | |
|---|---|---|---|
| 5,501,484 A | 3/1996 | Saderholm et al. | |
| 5,503,426 A * | 4/1996 | Lang | B21D 39/03 280/728.2 |
| 5,518,266 A | 5/1996 | O'Docherty et al. | |
| 5,547,213 A | 8/1996 | Lang et al. | |
| 5,741,024 A * | 4/1998 | Enders | B60R 21/2171 280/728.3 |
| 5,826,913 A * | 10/1998 | Mramor | B60R 21/217 280/728.2 |
| 6,234,521 B1 | 5/2001 | Katsuda et al. | |
| 7,350,800 B2 * | 4/2008 | Boyd | B60R 21/217 280/728.2 |
| 7,926,837 B2 * | 4/2011 | Harvey | B60R 21/2035 280/728.2 |
| 2001/0035632 A1 | 11/2001 | Amamori et al. | |
| 2016/0152204 A1 * | 6/2016 | Abe | B60R 21/217 280/728.2 |

FOREIGN PATENT DOCUMENTS

| | | | |
|---|---|---|---|
| JP | 10-29493 A | | 2/1998 |
| JP | 2001-301560 A | | 10/2001 |
| JP | 4560881 B2 | | 8/2010 |
| JP | 2011068268 A | * | 4/2011 |
| JP | 2012071754 A | * | 4/2012 |
| WO | WO 2014/057792 A1 | | 4/2014 |

* cited by examiner

FIXING STRUCTURE FOR INFLATOR AND AIRBAG

TECHNICAL FIELD

The present invention relates to a fixing structure for an inflator and an airbag which is used for an airbag apparatus installed on an automobile.

BACKGROUND OF THE INVENTION

An inflator is fixed together with an airbag inside a module case to be used as an airbag module. When fixing an inflator to a module case, a method of fixing the inflator to the module case by using a flange portion formed integrally with an inflator housing (see, for example, FIGS. 23 and 24 of JP-A No. H10-29493,) is usually employed.

FIGS. 4 and 5 of U.S. Pat. No. 5,547,213 disclose a structure in which an inflator 80 is fixed with a mounting device 30 in the form of a round plate.

FIG. 1 of U.S. Pat. No. 5,518,266 discloses a structure in which an inflator 12 and an airbag 16 are fixed to an inflator mounting flange 38 by using a mounting plate 14 and a retaining ring 18.

In JP-A No. H07-117611, a flange for mounting an inflator by welding is not required (in paragraphs 0004 and 0005), and a holding bracket 22 (in FIGS. 5 and 6 and paragraphs 0030 and 0031) capable of fastening and fixing is used instead thereof.

FIG. 1 in JP-B No. 4,560,881 discloses a structure in which an inflator 4 is fixed by a combination of a capping portion 20 and a reception area 14.

SUMMARY OF INVENTION

The present invention includes an invention 1 and an invention 2.

The invention 1 provides a fixing structure for an inflator (10) and an airbag (40), in which the inflator (10) and the airbag (40) are fixed by a fixing member to a plate portion (50) of a module case, including an outer shell of the inflator (10) being a housing (11) in a substantially columnar shape, the housing (11) including a gas discharge port (14) provided in a circumferential wall surface (11a) on one end surface (12) side in the axial direction, and a lower annular step surface (16) provided at a circumferential wall surface on the other end surface (13) side in the axial direction, the lower annular step surface being formed by reducing an outer diameter of the housing (11) on the other end surface (13) side, the fixing member being a lower fixing member (30) that supports and fixes the inflator (10) from a lower surface (50b) side of the plate portion (50), the lower fixing member (30) including a tubular wall portion (31) and a flange portion (32) formed at an opening at one end, the tubular wall portion (31) having an inner surface in such a shape that the tubular wall portion (31) is fitted to the circumferential wall surface including the lower annular step surface (16) of the inflator housing (11), and the flange portion (32) having a plurality of bolt holes (33), the fixing structure for the inflator (10) and the airbag (40) including the inflator (10) fitted into a hole, which is formed in the plate portion (50) of the module case, such that the circumferential wall surface (11a) provided with the gas discharge port (14) is on an upper surface (50a) side of the plate portion (50), and the circumferential wall surface including the lower annular step surface (16) is on a lower surface (50b) side of the plate portion (50), on the upper surface (50a) side of the plate portion (50), the airbag (40) covering and enclosing, from a bag opening, the circumferential wall surface (11a), provided with the gas discharge port (14), of the inflator housing (11), on the lower surface (50b) side of the plate portion (50) the lower fixing member (30) having the tubular wall portion (31) abutting against the circumferential wall surface, which includes the annular step surface (16) of the inflator housing (11), and the flange portion (32) abutting against the lower surface (50b) of the plate portion (50), and the airbag (40) and the lower fixing member (30) being fixed with a bolt (60) and a nut (61) mounted through the airbag (40), the plate portion (50) and the flange portion (32) of the lower fixing member.

The invention 2 provides a fixing structure for an inflator (10) and an airbag (40), in which the inflator (10) and the airbag (40) are fixed by two fixing members to a plate portion (50) of a module case, including an outer shell of the inflator (10) being a housing (11) in a substantially columnar shape, the housing (11) including a gas discharge port (14) provided in a circumferential wall surface (11a) on one end surface (12) side in the axial direction, and an upper annular step surface (15) and a lower step surface (16) provided at circumferential wall surfaces on the respective end surface (12, 13) sides in the axial direction, the upper annular step surface (15) and the lower annular step surface (16) being formed by reducing an outer diameter of the housing (11) on the respective end surface (12, 13) sides, the two fixing members being an upper fixing member (20) that supports and fixes the inflator (10) from an upper surface (50a) side of the plate portion (50), and a lower fixing member (30) that supports and fixes the inflator (10) from a lower surface (50b) side of the plate portion (50), the upper fixing member (20) including an annular flat portion (21) provided with a plurality of bolt holes (22), and an annular outer circumferential wall portion (23) extending vertically from an outer circumference of the annular flat portion (21), the lower fixing member (30) including a tubular wall portion (31) and a flange portion (32) formed at an opening at one end, the tubular wall portion (31) having an inner surface in such a shape that the tubular wall portion (31) is fitted to the circumferential wall surface including the annular step surface (16) of the inflator housing (11), and the flange portion (32) having a plurality of bolt holes (33), the fixing structure for the inflator (10) and the airbag (40) including the inflator (10) fitted into a hole, which is formed in the plate portion (50) of the module case, such that the circumferential wall surface (11a) provided with the gas discharge port (14) is on an upper surface (50a) side of the plate portion (50), and the circumferential wall surface including the lower annular step surface (16) is on a lower surface (50b) side of the plate portion (50), on the upper surface (50a) side of the plate portion (50), the airbag (40) covering and enclosing, from a bag opening, the circumferential wall surface provided with the gas discharge port (14), of the inflator housing (11), on the upper surface (50a) side of the plate portion (50), the upper fixing member (20) fitted to the inflator housing (11) such that the annular flat portion (21) abuts against the plate portion (50), with the airbag (40) being interposed therebetween, and an inner circumference of the annular flat portion (21) abuts against the upper annular step surface (15), on the lower surface (50b) side of the plate portion (50) the lower fixing member (30) having the tubular wall portion (31) abutting against the circumferential wall surface, which includes the annular step surface (16) of the inflator housing (11), and the flange portion (32) abutting against the lower surface (50b) of the plate portion (50), and the upper fixing member (20), the airbag (40) and the lower fixing member (30) being fixed with a bolt (60) and a nut (61) mounted through the upper fixing member (20), the airbag (40), the plate portion (50), and the flange portion (32) of the lower fixing member.

BRIEF DESCRIPTION OF THE DRAWINGS

The present invention will become more fully understood from the detailed description given hereinbelow and the accompanying drawings which are given by way of illustration only, and thus are no limitative of the present invention and wherein.

DETAILED DESCRIPTION OF INVENTION

Figure 1:
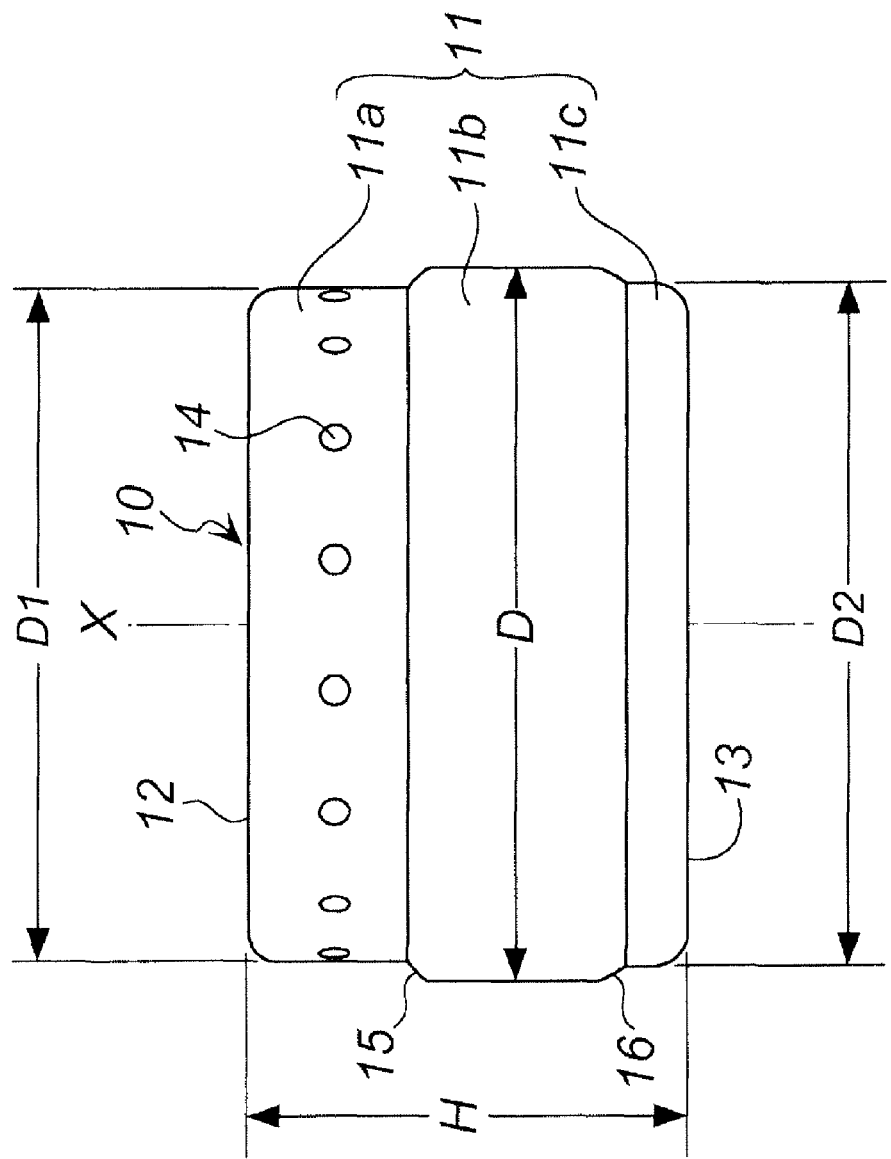
FIG. 1 shows a plan view of the inflator used in accordance with the present invention.

The advantage of using an inflator housing having a flange portion, such as disclosed in JP-A No. H10-29493, can be that the inflator housing is easily fixed to the module case and sufficient fixing strength can be ensured.

However, since the flange portion is formed integrally with the inflator housing, the flange portion needs to be of the same material and as thick as the inflator housing, although it is not required to have pressure resistance the same as that of the inflator housing.

Therefore, from the standpoint of maintaining the mounting strength and also reducing the weight of the entire airbag module, there is still room for improvement.

FIGS. 4 and 5 of U.S. Pat. No. 5,547,213 do not suggest a sufficient mounting strength.

The mounting plate 14 and the retaining ring 18 in U.S. Pat. No. 5,518,266 have a thickness the same as or greater than that of the inflator mounting flange 38, which is not sufficient in terms of weight reduction.

JP-A No. H07-117611 does not refer to weight reduction of the holding bracket 22 itself. In JP-B No. 4,560,881, weight reduction is insufficient.

The present invention provides a fixing structure for an inflator and an airbag which is reduced in weight as a whole by comparison with the airbag module having a fixing structure for fixing to a module case by using a flange portion formed integrally with the inflator housing.

The preferable aspects (1), (2), and (3) of the invention 1 and the invention 2 are described hereinbelow.

(1) The fixing structure for an inflator and an airbag according to the invention 1 or the invention 2, wherein the fixing member is formed of a metal that is the same as a metal forming the inflator housing, and the thickness of the fixing member is less than the thickness of the inflator housing.

(2) The fixing structure for an inflator and an airbag according to the invention 1 or the invention 2, wherein the fixing member is formed of a metal that is different from a metal forming the inflator housing, and the metal forming the fixing member is less in specific gravity than the metal forming the inflator housing.

(3) The fixing structure for an inflator and an airbag according to the invention 1 or the invention 2, wherein the fixing member is formed of a resin or a composite including a resin.

By contrast with the conventional arts in which a flange portion formed integrally with an inflator housing is used for fixing to a module case, the fixing structure for an inflator and an airbag in accordance with the present invention does not require the flange portion, and the inflator is fixed to a module case by using a separate member.

Further, with the fixing structure for an inflator and an airbag in accordance with the present invention, the fixing strength of the inflator to the module case is maintained at a high level and the entire airbag module is reduced in weight.

The outer diameter of the inflator housing in accordance with the present invention has a substantially columnar shape, and it is preferred that the maximum outer diameter (D) and the height (H) are such that the ratio (H/D) is about 0.5 to 1.5, but the ratio may also be outside this range.

The fixing strength is maintained at a high level by interrelating and combining the outer shape of the inflator housing and the shape of the fixing member. The inflator housing has a lower annular step surface at a circumferential wall surface on the other end surface side in the axial direction, the lower annular step surface being formed by reducing an outer diameter of the housing toward the other end surface side.

The lower annular step surface may be an annular inclined surface formed by continuously reducing the outer diameter of the housing, or an annular flat surface formed by a step.

The tubular wall portion of the lower fixing member has an inner surface in a shape that enables fitting on the circumferential wall surface of the inflator housing including the annular step surface. The configuration is also inclusive of the case in which a shape of the outer surface of the circumferential wall surface and a shape of the inner surface of the tubular wall portion of the lower fixing member are matched, but they do not have to be matched, provided that they are fitted to each other.

Since the circumferential wall surface of the inflator housing including the lower annular step surface and the tubular wall portion of the fixing member are in contact with each other, the fixing strength is increased.

Further, preferably, the outer diameter of the circumferential wall surface of the inflator housing including the lower annular step surface or the inner diameter of the tubular wall portion of the lower fixing member is adjusted such that the circumferential wall surface of the inflator housing including the annular step surface is press-fitted to the tubular wall portion of the lower fixing member, and thereby, the fixing strength is enhanced.

The reduction of the entire airbag module in weight is implemented in the following manner. (I) When the fixing member and inflator housing are formed from the same metal, the thickness of the fixing member is made less than that of the inflator housing. Since a high pressure is applied from the inside to the inflator housing at the time of activation, a thickness is needed that can maintain pressure resistance. Since the fixing member is formed separately from the inflator housing, the fixing member does not require the abovementioned pressure resistance, and therefore a thickness of the fixing member is made smaller than that of the inflator housing.

Where industrial mass production is considered, such a reduction in thickness makes it possible to save the metal material to be used and also reduce the production cost.

(II) When the fixing member and the inflator housing are formed from different metals, a metal with a specific gravity less than that of the metal forming the inflator housing is used for forming the fixing member. For example, when the inflator housing is made of stainless steel or iron, the fixing member is made of aluminum. The thickness of the fixing member is made smaller in the same manner as in (I) hereinabove also when different metals are used.

(III) The fixing member is not made of a metal, but made of a resin or a composite including a resin. The resin is a known resin, and a synthetic resin or a natural resin is used. The resin may be a thermoplastic resin or a thermosetting resin and can be also compounded with a known filler for resin.

A composite including a resin can be a composite including a resin and inorganic fibers, organic fibers, or metallic fibers, a composite of a resin and a metal foil or a thin metal sheet, and a thin sheet composite (thin sheet made of an inorganic material and a resin) made of a resin and an inorganic material (including a carbon fiber material).

In the fixing structure for an inflator and an airbag in accordance with the present invention, no flange portion is required and the inflator is fixed to the module case by using a separate member as in the above-described invention, by contrast with the conventional arts in which the inflator is fixed to the module case by using a flange portion molded integrally with the inflator housing.

Further, the fixing structure for an inflator and an airbag in accordance with the present invention also uses two fixing members, rather than one fixing member as in the above-described invention. In such a case, the fixing strength of the inflator to the module case is further increased, but the mass increases correspondingly to the increase in the number of fixing members.

The fixing strength is maintained at a high level by interrelating and combining the outer shape of the inflator housing and the shape of the fixing members.

The inflator housing has an upper annular step surface and a lower annular step surface. The upper fixing member is fixed to the upper annular step surface, and the lower fixing member is fixed to the circumferential wall surface including the lower annular step surface. The upper annular step surface and the lower annular step surface each may be an annular inclined surface which is formed by continuously reducing the outer diameter of the housing, or an annular flat surface formed by a step. Alternatively, one of them may be an annular inclined surface and the other may be an annular flat surface formed by a step.

The fixing strength is enhanced by the support of two fixing members from above and below in the axial direction of the inflator housing.

Further, preferably, the outer diameter of the circumferential wall surface of the inflator housing including the lower annular step surface and the inner diameter of the tubular wall portion of the lower fixing member are adjusted such that the circumferential wall surface of the inflator housing including the lower annular step surface is press-fitted to the tubular wall portion of the lower fixing member, and thereby, the fixing strength is enhanced.

The above-described (I) to (III) are implemented with respect to both the upper fixing member and the lower fixing member in order to reduce the weight of the entire airbag module.

When the upper fixing member and the lower fixing member are made of the same metal or resin, the weight is reduced by making the thickness of the upper fixing member smaller.

With the fixing structure for an inflator and an airbag in accordance with the present invention, the inflator and the airbag are fixed to the module case with a high fixing strength and the total weight is reduced.

Embodiments of the Invention

Figure 2:
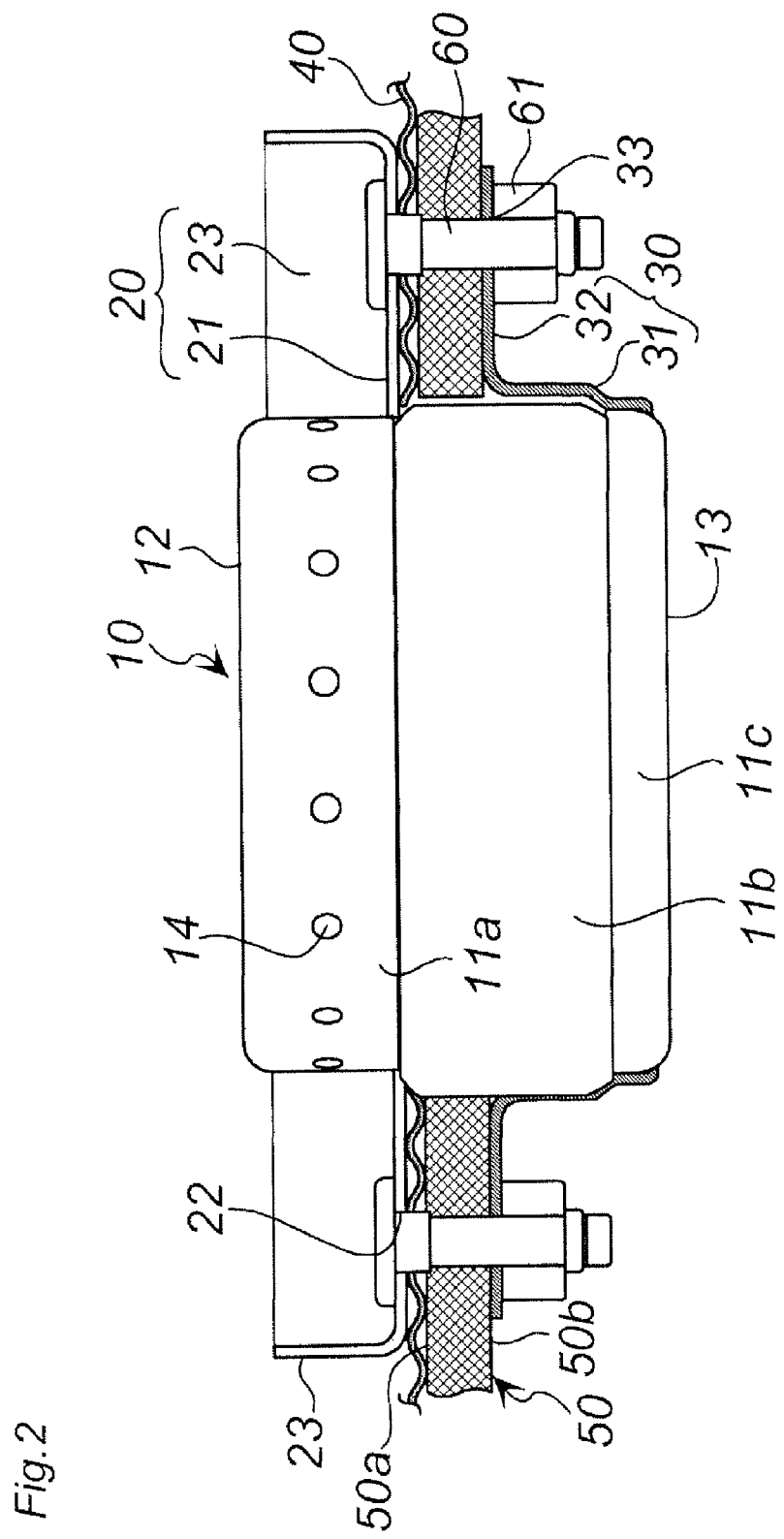
FIG. 2 shows a plan view illustrating the fixing structure for an inflator and an airbag in accordance with the present invention. In the state shown herein, the front sides of the fixing members, the airbag, and the module case (the plate portion) are removed.

An embodiment of the present invention will be explained hereinbelow with reference to FIGS. 1 and 2. FIG. 1 shows a plan view of an inflator used in the present invention. FIG. 2 shows a plan view illustrating a fixing structure for an inflator and an airbag in accordance with the present invention.

A housing 11 forming the outer shell of an inflator 10 is of a substantially columnar shape, and the H/D ratio thereof (D is a maximum outer diameter) is within a range of 0.5 to 0.8. The inflator housing 11 is made of a metal with a thickness about 0.5 mm to 2.0 mm and has overall a constant thickness.

The housing 11 includes an upper circumferential wall surface 11a, an intermediate circumferential wall surface 11b and a lower circumferential wall surface 11c in the order of description from one end surface 12 towards the other end surface 13 (in the axis X direction).

The outer diameter (D1) of the upper circumferential wall surface 11a, the outer diameter (D) of the intermediate circumferential wall surface 11b, and the outer diameter (D2) of the lower circumferential wall surface 11c are adjusted to satisfy the relationship D>D2>D1, and as long as D is the largest, D1 and D2 may have the same value or the relationship of D1>D2.

A plurality of gas discharge ports 14 is formed equidistantly in the circumferential direction in the upper circumferential wall surface 11a on the one end surface 12 side.

An upper annular step surface 15 which continuously decreases in outer diameter towards the one end surface 12 is formed between the upper circumferential wall surface 11a and the intermediate circumferential wall surface 11b.

The outer diameter (D) of the intermediate circumferential wall surface 11b and the outer diameter (D1) of the upper circumferential wall surface 11a may be such that the D1/D ratio is within a range of about 0.90 to 0.98.

A lower annular step surface 16 which continuously decreases in outer diameter towards the end surface 13 is formed between the lower circumferential wall surface 11c and the intermediate circumferential wall surface 11b.

The outer diameter (D) of the intermediate circumferential wall surface 11b and the outer diameter (D2) of the lower circumferential wall surface 11c may be such that the D2/D ratio is within a range of about 0.90 to 0.98.

The fixing member includes a combination of an upper fixing member 20 and a lower fixing member 30. The upper fixing member 20 has an annular flat portion 21 having a plurality of bolt holes 22 and an annular outer circumferential wall portion 23 extending vertically from the outer circumference of the annular flat portion 21.

The outer diameter of the inner hole of the annular flat portion 21 is adjusted to match the outer diameter of the boundary portion of the circumferential wall surface 11a and the upper annular step surface 15.

The annular flat portion 21 supports the inflator 10 and also fixes an airbag 40. The annular outer circumferential wall portion 23 allows the gas discharged from the gas discharge ports 14 to collide therewith and thereby, changes the direction of the gas flow, so that the introduction of the gas into the airbag 40 is facilitated.

When the upper fixing member 20 is made of steel the same as that of the inflator housing 11, since no pressure resistance is required for the upper fixing member, the thickness thereof can be less than that of the inflator housing 11, and where the thickness of the inflator housing 11 is 1.0 mm, the thickness of the upper fixing member can be 0.1 mm to 0.5 mm.

When the inflator housing 11 is made of steel, where the thickness of the inflator housing 11 is 1.0 mm, the upper fixing member 20 can be made of a resin with a thickness of about 0.5 mm to 1.0 mm.

The lower fixing member 30 has a tubular wall portion 31 and a flange portion 32 formed at an opening on one end.

The tubular wall portion 31 has an inner surface in a shape that matches the surface shapes of the intermediate circumferential wall surface 11b, the annular step surface 16, and the lower circumferential wall surface 11c of the inflator housing 11. In this case, the inner diameter of the wall surface of the tubular wall portion 31 is adjusted in relation to the intermediate circumferential wall surface 11b and the lower circumferential wall surface 11c such as to be slightly less than the outer diameter (D) of the intermediate circumferential wall surface 11b and the outer diameter (D2) of the lower circumferential wall surface 11c. The flange portion 32 has a plurality of bolt holes 33.

When the lower fixing member 30 is made of steel the same as that of the inflator housing 11, since no pressure resistance is required for the lower fixing member, the thickness thereof can be less than that of the inflator housing 11, and where the thickness of the inflator housing 11 is 1.0 mm, the thickness of the lower fixing member can be 0.5 mm to 0.8 mm.

When the inflator housing 11 is made of steel, where the thickness of the inflator housing 11 is 1.0 mm, the lower fixing member 30 can be made of aluminum with a thickness of about 2.5 mm to 4.0 mm.

It is possible to use only the lower fixing member 30 as the fixing member, without using the upper fixing member 20. When the upper fixing member 20 and the lower fixing member 30 are used in combination and made of the same material, the thickness of the upper fixing member 20 can be made less than that of the lower fixing member. For example, the thickness of the upper fixing member 20 can be set within a range of 50% to 90% of the thickness of the lower fixing member 30.

The fixing structure for the inflator 10 and the airbag 40 will be explained hereinbelow with reference to FIG. 2. The inflator 10 is fitted into a hole which is formed in advance in the plate portion 50 of the module case. The inflator 10 is fitted such that the upper circumferential wall surface 11a and the upper annular step surface 15 of the inflator housing 11 protrude beyond an upper surface 50a of the plate portion 50, and the lower circumferential wall surface 11c, the lower annular step surface 16, and part of the intermediate circumferential wall surface 11b protrude beyond a lower surface 50b of the plate portion. The remaining portion of the intermediate circumferential wall surface 11b is in contact with the inner circumferential surface of the hole of the plate portion 50.

The airbag 40 is shaped as a bag having an opening (a bag opening) and is usually made of nylon.

The airbag 40 covers and encloses, from the opening, the upper circumferential wall surface 11a including the gas discharge ports 14 of the inflator housing 11 on the upper surface 50a of the plate portion 50.

On the upper surface 50a side of the plate portion 50, the upper fixing member 20 is fitted into the inflator housing 11 such that the annular flat portion 21 abuts against the plate portion 50, with the airbag 40 being interposed therebetween and that the inner circumference of the annular flat portion 21 abuts against the boundary portion of the upper circumferential wall surface 11a and the upper annular step surface 15. The upper fixing member 20 may abut against the upper annular step surface 15.

On the lower surface 50b side of the plate portion 50, in the lower fixing member 30, the tubular wall portion 31 abuts against the intermediate circumferential wall surface 11b, the lower annular step surface 16 and the lower circumferential wall surface 11c of the inflator housing 11, and the flange portion 32 abuts against the lower surface 50b of the plate portion.

The upper fixing member 20, the airbag 40, and the lower fixing member 30 are fixed by nuts 61 and bolts 60 mounted through the bolt holes 22 in the upper fixing member 20, bolt holes formed at the circumference of the opening of the airbag 40, bolt holes formed in the plate portion 50, and bolt holes formed in the flange portion 32 of the lower fixing member 30.

The preferred fixing procedure of a fixing structure for an inflator and an airbag will be explained hereinbelow.

The upper fixing member 20, the airbag 40, and the lower fixing member 30 are mounted with bolts 60 and nuts 61 on the plate portion 50. The inflator 10 is then fitted from the lower fixing member 30. In this case, the fitting operation is easily performed because the outer diameter (D1) of the upper circumferential wall surface 11a, the outer diameter (D) of the intermediate circumferential wall surface 11b, and the outer diameter (D2) of the lower circumferential wall surface 11c are adjusted to satisfy the relationship D>D2>D1.

Further, since the inner diameter of the wall surface of the tubular wall portion 31 is adjusted in relation to the intermediate circumferential wall surface 11b and the lower circumferential wall surface 11c such as to be slightly less than the outer diameter (D) of the intermediate circumferential wall surface 11b and the outer diameter (D2) of the lower circumferential wall surface 11c, the intermediate circumferential wall surface 11b and the lower circumferential wall surface 11c are pressed from the outside by the tubular wall portion 31 after the fitting (that is, the press-fitted state is assumed). Therefore, the fixing strength is increased.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A fixing structure for an inflator and an airbag, in which the inflator and the airbag are fixed by two fixing members to a plate portion of a module case, comprising
    an outer shell of the inflator being a housing in a substantially columnar shape,
    the housing including
        a gas discharge port provided in a circumferential wall surface on one end of the housing in the axial direction, and
        an upper annular step surface and a lower annular step surface provided at circumferential wall surfaces of the outer shell on upper and lower ends thereof, respectively, in the axial direction, the upper annular step surface and the lower annular step surface being formed by reducing an outer diameter of the housing on the respective ends,
    the two fixing members being an upper fixing member that supports and fixes the inflator from an upper surface side of the plate portion, and a lower fixing member that supports and fixes the inflator from a lower surface side of the plate portion, the upper fixing member including an annular flat portion provided with a plurality of bolt holes, and an annular outer circumferential wall portion extending vertically from an outer circumference of the annular flat portion,
    the lower fixing member including
        a tubular wall portion and a flange portion formed at an opening at one end,
        the tubular wall portion having an inner surface in such a shape that the tubular wall portion is fitted to the circumferential wall surface including the lower annular step surface of the inflator housing, and
        the flange portion having a plurality of bolt holes,
    the fixing structure for the inflator and the airbag including
        the inflator fitted into a hole, which is formed in the plate portion of the module case, such that the circumferential wall surface provided with the gas discharge port is on an upper surface side of the plate portion, and the circumferential wall surface including the lower annular step surface is on a lower surface side of the plate portion,
        on the upper surface side of the plate portion, the airbag covering and enclosing, from a bag opening, the circumferential wall surface provided with the gas discharge port, of the inflator housing,
        on the upper surface side of the plate portion, the upper fixing member fitted to the inflator housing such that the annular flat portion abuts against the plate portion, with the airbag being interposed therebetween, and an inner circumference of the annular flat portion abuts against the upper annular step surface,
        on the lower surface side of the plate portion the lower fixing member having the tubular wall portion abutting against the circumferential wall surface, which includes the lower annular step surface of the inflator housing, and the flange portion abutting against the lower surface of the plate portion, and
        the upper fixing member, the airbag and the lower fixing member being fixed with a bolt and a nut mounted through the upper fixing member, the airbag, the plate portion, and the flange portion of the lower fixing member.

2. The fixing structure for an inflator and an airbag according to claim 1, wherein at least one of said fixing members is formed of a metal that is the same as a metal forming the inflator housing, and the thickness of said at least one of said fixing members is less than the thickness of the inflator housing.

3. The fixing structure for an inflator and an airbag according to claim 1, wherein at least one of said fixing members is formed of a metal that is different from a metal forming the inflator housing, and the metal forming said at least one of said fixing members is less in specific gravity than the metal forming the inflator housing.

4. The fixing structure for an inflator and an airbag according to claim 1, wherein at least one of said fixing members is formed of a resin or a composite including a resin.

* * * * *